United States Patent [19]

Vann

[11] E Patent Number: Re. 32,755

[45] Reissued Date of Patent: Sep. 27, 1988

[54] ACCELERATED DOWNHOLE PRESSURE TESTING

[75] Inventor: Roy R. Vann, DeQueen, Ark.

[73] Assignee: Halliburton Company, Wilmington, Del.

[21] Appl. No.: 845,229

[22] Filed: Mar. 28, 1986

Related U.S. Patent Documents

Reissue of:

[64] Patent No.: 4,480,690
Issued: Nov. 6, 1984
Appl. No.: 465,565
Filed: Feb. 10, 1983

U.S. Applications:

[63] Continuation-in-part of Ser. No. 235,048, Feb. 17, 1981, abandoned.

[51] Int. Cl.[4] ..... E21B 43/11; E21B 47/06

[52] U.S. Cl. ..... 166/250; 166/297; 175/4.52

[58] Field of Search ..... 166/250, 297, 64, 66, 166/133, 113, 117.5, 188, 55.1, 330, 331; 175/4.51, 4.52, 4.56, 48, 103; 73/155, 151

[56] References Cited

U.S. PATENT DOCUMENTS

| | | | |
|---|---|---|---|
| 2,169,559 | 8/1939 | Halliburton | 175/4 |
| 2,379,138 | 6/1945 | Fitting et al. | 73/155 |
| 2,702,474 | 2/1955 | Johnston | 166/128 X |
| 2,740,479 | 4/1956 | Schwegman | 166/145 |
| 2,760,581 | 8/1956 | Johnston et al. | 166/128 |
| 2,982,130 | 5/1961 | McMahan | 166/100 X |
| 3,041,875 | 7/1962 | Ressby | 73/155 |
| 3,062,052 | 11/1962 | Kolb | 73/704 |
| 3,308,882 | 3/1967 | Lebourg | 166/138 X |
| 3,323,361 | 6/1967 | Lebourg | 166/100 X |
| 3,327,781 | 6/1967 | Nutter | 166/250 |
| 3,333,639 | 8/1967 | Page et al. | 166/120 |
| 3,448,611 | 6/1969 | Lebourg | 166/250 X |
| 3,478,584 | 11/1969 | Strubhar et al. | 73/155 |
| 3,664,415 | 5/1972 | Wray et al. | 166/336 |
| 3,706,344 | 12/1972 | Vann | 166/297 |
| 3,717,095 | 2/1973 | Vann | 175/455 X |
| 3,727,683 | 4/1973 | Terrel et al. | 166/117.5 |
| 3,824,850 | 7/1974 | Nutter | 73/151 |
| 3,871,448 | 3/1975 | Vann et al. | 166/128 |
| 3,931,855 | 1/1976 | Vann et al. | 166/128 |
| 3,939,705 | 2/1976 | Glotin et al. | 73/151 |
| 3,970,147 | 7/1976 | Jessup et al. | 166/250 |
| 4,040,485 | 4/1977 | Vann et al. | 166/297 |
| 4,050,512 | 9/1977 | Giebeler | 166/128 |
| 4,051,897 | 10/1977 | Kipgelin | 166/125 |
| 4,149,593 | 4/1979 | Gazda et al. | 166/113 |
| 4,151,880 | 5/1979 | Vann | 166/373 |
| 4,159,643 | 7/1979 | Watkins | 73/155 |
| 4,248,300 | 2/1981 | Braddick | 166/250 |
| 4,274,485 | 6/1981 | Fredd | 166/250 |
| 4,274,486 | 6/1981 | Fredd | 166/250 |
| 4,278,130 | 7/1981 | Evans et al. | 166/332 |
| 4,295,796 | 10/1981 | Moore | 166/117.5 X |
| 4,316,386 | 2/1982 | Kerekes | 73/151 |
| 4,487,261 | 12/1984 | Gazda | 166/264 |
| 4,509,604 | 4/1985 | Upchurch | 175/4.52 |
| 4,510,797 | 4/1985 | Guidry et al. | 73/151 |

OTHER PUBLICATIONS (Amoco Production Company Vannsystem Completion and Well Test, May 1, 1979 (Attachment A).

Exploratory Completing and Testing, Apr. 5, 1979 (Attachment B).

Baker Service Tools Balls Valve-Tubing Reciprocation Actuated, Apr. 9, 1981 (Attachments C, D and E).

II Composite Catalog of Oil Field Equipment & Services, 3286-88 (1978-1979).

Johnston Testers, Inc., "Shoot-N-Test" (1954) and Associated Affidavits.

IV Composite Catalog of Oil Field Equipment and Services, pp. 6425-6426 ( 1982-1983).

"Use of Tubulars for Effective Completions," Materials with Presentation by Charles W. Kinney of Geo Vann, Inc. presented at South Western Petroleum Short Course, Lubbock, Texas, Apr. 23-24, 1981.

"Memorandum," from: Conrad Pearson, to: All Operating Personnel, Re: Operating Report on the Use of the Vannsystem Drill Stem Test Tools, Mar. 5, 1982.

Peabody Vann brochure entitled "The Power to Solve the Problem is Waiting to be Used" (1980).

Geo. Vann brochure entitled "Vannsystem Completions" (1981).

Drawing (Attachment D).

Slides (Attachment E).

Memorandum to Roy R. Vann from Charles Kinney dated Jun. 8, 1981 (Attachment F).
Proposal to Amoco Production Co. (presented by Peabody Vann prior to May 1, 1979) (Attachment A).
Disclosure Made to Canmar of Calgary, Canada (sent by Peabody Vann on or about Apr. 5, 1979) (Attachment B).
Letter dated Apr. 9, 1981 by Mr. Kinney of Vann (Attachment C).
Memorandum to Marcus Bates from Charles Kinney dated Nov. 3, 1981 (Attachment G).
Letter to Butler, Binion Firm from Jim Current of Geo Vann dated Jun. 16, 1982 (Attachment H).

*Primary Examiner*—Thuy M. Bui
*Attorney, Agent, or Firm*—Finnegan, Henderson, Farabow, Garrett & Dunner

[57] ABSTRACT

The present invention provides a method and apparatus for completing a well by means of a perforating gun attached to the downhole end of a string of production tubing, producing the well until it is clean, shutting-in the well at a point relatively near the perforating gun, and measuring the shut-in pressure.

54 Claims, 2 Drawing Sheets

ACCELERATED DOWNHOLE PRESSURE TESTING

Matter enclosed in heavy brackets [ ] appears in the original patent but forms no part of this reissue specification; matter printed in italics indicates the additions made by reissue.

CROSS-REFERENCE TO RELATED APPLICATIONS

This application *is a reissue, of Ser. No. 06/465,565, now U.S. Pat. No. 4,480,690; which* is a continuation-in-part of application Ser. No. 235,048, filed Feb. 17, 1981, now abandoned by Roy R. Vann, and entitled, "Accelerated Downhole Pressure Testing."

BACKGROUND OF THE INVENTION

The present invention relates to the field of oil well completion and formation testing and, more particularly, to an improved method and apparatus for determining the shut-in pressure of a hydrocarbon formation. Still more particularly, the present invention includes a method and apparatus for measuring the shut-in pressure of a hydrocarbon formation perforated by a perforating gun suspended from a tubing string.

One method for testing a formation in a cased well includes running an electric line casing gun perforator in mud of sufficient weight to control the well pressure, perforating the casing adjacent to the zone to be tested, and then withdrawing the perforating gun. Test tools are then run into the well on a pipe string with well pressure being controlled with casing fluid of appropriate weight. A packer is set to close the annulus and a valve is opened in the pipe string to permit fluids from the formation to flow through the pipe string to the surface.

A second method for testing a formation includes running a tool string on drill pipe into the cased borehole with the tool string including full opening test tools with a full opening valve, and a packer disposed on the tool string for packing off the annulus. The casing adjacent to the zone to be tested is packed off with the packer and the full opening valve is then opened, providing fluid communication between the flow bore of the pipe string and the lower packed off portion of the casing. A small through-tubing perforating gun is lowered on an electric line through the test tools, and the casing adjacent the zone is perforated. The wireline perforating gun is then lubricated out of the well.

Another formation testing method is disclosed in the U.S. Pat. No. 2,169,559. In the '559 patent, a formation tester, sub, packer, perforated pipe, perforating gun, and bull plug are all suspended on the end of a drill pipe string. The formation tester includes a limited opening valve and a mandrel for opening the valve. A number of passageways in the sub permit fluid flow from a point beneath the sub into the formation tester. The bull plug below the perforating gun may include a pressure recording apparatus. In operation, the packer is set to seal the lower portion of the well from the portion above the packer and the drill pipe is rotated and lowered causing the mandrel to open the valve in the formation tester. This actuates the perforating gun which detonates and perforates the formation. Any fluid in the formation then flows through the perforations and through the perforated pipe above the perforating gun. This fluid must then pass through the limited openings of the passageways in the sub and of the valve and into the drill pipe. After a sufficient length of time, the drill pipe is lifted to allow the valve to close. When the valve closes, a sample of the fluid from the formation is entrapped in the drill pipe. The packer is then released and the entire assembly is removed from the well with the entrapped sample.

Various drill stem test procedures may be used in determining the potential productivity of a subsurface hydrocarbon formation which has previously been perforated. The typical procedure begins by including in the drill string various test apparatus. After the packer is set to seal the casing annulus below the packer, the well is perforated and the formation is then permitted to produce through the drill string to provide an indication of the ability of the formation to produce without the use of enhancement techniques.

After a specified time interval, a tester valve positioned in the drill string above the packer is closed, thereby closing-in the hydrocarbon formation. Pressure measuring apparatus within the closed-in portion of the drill string records the rate of pressure build-up and the ultimate shut-in pressure of the hydrocarbon formation. This data also provides an accurate basis for evaluating the hydrocarbon formation, including, for example, the well's production capability, transmissibility, actual flow capacity, permeability, and formation damage. After the test sequence is completed, pressure above and below the packer is equalized, the packer is unseated, formation fluid is flushed from the drill string by reverse circulation, and the drill pipe is pulled from the well. The drill stem test procedure is further described in II Composite Catalog of Oil Field Equipment & Services, 3286-88 (1978-1979) and U.S. Pat. No. 3,970,147 to Jessup et al.

Well completion is typically accomplished by running a small through-tubing perforating gun on a wireline through the tubing string suspended and packed off in the cased borehole. The borehole is filled with drilling mud or some other appropriate fluid so as to prevent the blow-out of the perforating gun upon detonation. However, this drilling fluid also prevents the flow of hydrocarbon fluids into the borehole at the time of perforation. Generally, the through-tubing perforating gun is actuated electrically. After the through-tubing gun is lubricated out of the well, the control fluid in the tubing string is removed to bring in the well.

Another method for completing oil and/or gas wells, now well known in the art, includes lowering into the cased borehole and tubing string and perforating the well by shooting perforations through the casing and cement into the hydrocarbon formation to permit the hydrocarbons to flow into the cased borehole and up to the surface. U.S. Pat. No. 3,706,344 to Vann discloses the method of suspending a packer and perforating gun on a tubing string, setting the packer to isolate the production zone, releasing the trapped pressure below the packer by opening the tubing string to fluid flow, actuating the perforating gun through the tubing string, and immediately producing the well through the tubing string upon perforation. One means for actuating the perforating gun includes dropping a bar through the tubing string to impact the firing head of the perforating gun.

Vann's completion technique exhibits several advantages, as are described in the above-named patent, over prior art completion techniques. Vann's technique does not, however, provide for any particular means for evaluating the potential of the formation. Use of the drill stem test procedure with Vann's technique would require unseating the packer and pulling the entire tubing string from the borehole, thereby defeating one of the advantages of the Vann method. Hence, it would be useful to devise a method and apparatus for evaluating and testing a hydrocarbon formation, the method and apparatus being particularly useful in conjunction with a formation testing or well completion method where the perforating gun is suspended on the tubing string.

SUMMARY OF THE INVENTION

The present invention includes a method and apparatus for measuring downhole pressure and/or temperature of an oil or gas well and is particularly useful where the well has been perforated by a perforating gun suspended on a tubing string. A tubing string having a valve, pressure sensing means, an on/off sub, blanking plug sub, packer vent assembly, release coupling, and perforating gun are lowered and suspended within the well with the gun adjacent to the formation to be tested or completed. The valve is located above, but relatively near to, the perforating gun, particularly as compared to the distance between the gun and the surface.

After the perforating gun has been detonated to perforate the formation, and hydrocarbon fluids have been permitted to flow into the tubing string via the vent assembly to clean out the well, the valve is closed to prevent further hydrocarbon flow through the tubing string to the surface. Closing the valve shuts-in the well. The pressure from the formation then builds up in the lower borehole annulus below the valve and packer. The shut-in pressure is then sensed by the pressure sensing means.

The pressure sensing means may take the form of several embodiments. It should be understood that each of the embodiments may function separately and alone to accomplish the objectives of the invention and no individual embodiment is preferred over another. Each embodiment of the sensing means includes a small housing disposed on the exterior of the tubing string below the valve. The housing forms a chamber therewithin. A port or aperture through the wall of the tubing string provides fluid communication between the flow bore of the tubing string below the valve and the chamber of the housing.

In one embodiment, the sensing means includes a small diameter pressure tubing extending from the housing up the tubing/casing annulus to the surface. The lower end of the pressure tubing is in fluid communication with the chamber of the housing and the other end is connected to a pressure monitor device. The pressure monitor device includes constant, regulated flow of fluid through a flowmeter and pressure sensor and into the pressure tubing. The pressure sensor at the surface provides output signals which are communicated to a recording device.

In operation, the shut-in pressure will vary the pressure at the pressure sensor as the flow rate of the fluid passing through the pressure tubing, chamber, and into the flow bore of the tubing string is held constant. The shut-in pressure is thus measured at the surface. It should be understood that the discharge pressure at the surface is held constant the shut-in pressure is determined from the change in flow rate at the surface.

One variation of this embodiment is the disposal of a diaphragm on the lower end of the small diameter pressure tubing (within the chamber) to prevent commingling of the fluid in the pressure tubing with the hydrocarbon fluids in the tubing string. In this embodiment, the fluid does not flow through the pressure tubing but merely transmits the variation in the downhole pressure as the diaphragm flexes in response to the downhole pressure.

Still another embodiment is a self-contained pressure sensing and measuring means which is disposed within the chamber of the housing. The pressure tubing described for previous embodiments is not present in this embodiment. This embodiment requires the retrieval of the pressure sensing and measuring means.

Although the above embodiments have been described as method and apparatus for measuring the shut-in pressure, they may also be used to provide a continuous monitoring of the downhole pressure. Thus, the present invention is not limited to closing the flow bore of the tubing string but can be used to measure downhole pressure of a producing well with hydrocarbon fluids flowing to the surface during pressure measurement.

The present invention overcomes the problems of the prior art by providing an efficient technique and apparatus by the use of which a well may be perforated with a gun suspended on a tubing string, with its inherent advantages, and subsequently tested and evaluated without defeating the advantages of such a technique, and without introducing additional time into the perforating process. These and other objects and advantages of the present invention will become readily apparent to those skilled in the art on reading the following detailed description and claims and by referring to the accompanying drawings.

BRIEF DESCRIPTION OF THE DRAWINGS

For a detailed description of the preferred embodiments of the invention, reference will now be made to the accompanying drawings wherein.

DESCRIPTION OF THE PREFERRED EMBODIMENT

Perforation of a cased borehole and testing of the surrounding hydrocarbon formation are key steps in the completion of an oil well. Evaluation of the test results provides information regarding the size of the reservoir, the type of fluid or gas within the formation, whether the well will free-flow or will require some type of artificial lift, the permeability of the formation, formation damage, and other important characteristics. Measurements of temperature and pressure, particularly shut-in pressure, are key indicators of the aforenoted characteristics.

Shut-in pressure is the pressure developed within the wellbore subsequent to perforating the casing and hydrocarbon formation and sealing off (closing-in or shutting-in) the well. The present invention provides a method and apparatus for determining the shut-in pressure, as well as temperature and other pressure measurements, when the well is perforated by means of a perforating gun affixed to the lower end of a string of production tubing.

Figure 1:
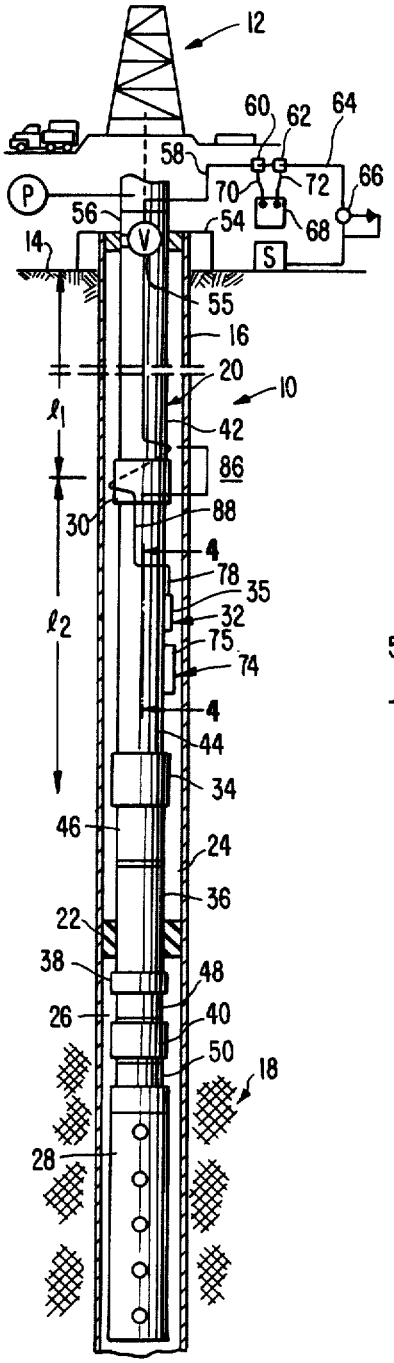
FIG. 1 shows a part diagrammatical, part schematical, cross-sectional view of a cased borehole having disposed therein a string of tubing arranged in accordance with the principles of the present invention and illustrating multiple embodiments of the invention.

Referring now to FIG. 1, there is shown a borehole, shown generally at 10, extending generally vertically from the surface 14 of the ground beneath a drilling rig 12 into a hydrocarbon formation 18. The interior of the borehole 10 is lined with a casing 16, typically formed of a cement mixture, for securing the integrity of borehole 10. A string of production tubing 20 extends concentrically within the cased borehole from the surface 14 to a point adjacent hydrocarbon formation 18 and supports on the lower end thereof a perforating gun 28.

Tubing string 20 includes an upper tubing portion 42 extending from surface 14 to a valve 30, a medial tubing portion 44 extending from valve 30 to an on/off sub 34, and a lower tubing portion 46 extending from the on/off sub 34 to the perforating gun 28. The medial tubing portion includes a pressure sensing means, indicated at 32 and 74, mounted on the exterior of tubing string 20, and projecting into the annulus formed by tubing string 20 and casing 16. The lower tubing portion includes a packer 22, blanking plug sub 36, vent assembly 38, releasable coupling 40 and perforating gun 28.

Perforating gun 28 may be any apparatus suitable for forming perforations or channels through the casing 16 and into the surrounding geological formation, so as to permit the flow of hydrocarbon fluids from formation 18 into tubing string 20, via vent assembly 38. Perforating guns which meet the aforestated requirement are disclosed in greater detail in U.S. Pat. No. 3,706,344 and U.S. Pat. No. 3,717,095, which are hereby incorporated by reference.

At a point above and relatively near the perforating gun 28, for example, within ten feet thereof, packer 22 forms a fluid seal between casing 16 and tubing string 20 and thereby divides the annulus formed by casing 16 and tubing string 20 into an upper annulus 24 and a lower annulus 26. Packer 22 prevents the flow of hydrocarbons into upper annulus 24, thereby directing the flow through ports in vent assembly 38 into tubing string 20 and up to the surface 14. U.S. Pat. Nos. 3,871,448, 3,931,855, 4,040,485, and 4,151,880 show suitable packer and vent assemblies and the actuation thereof in greater detail and are hereby incorporated by reference.

Referring still to FIG. 1, tubing release coupling 40 is connected in series with tubing string 20 between vent assembly 38 and perforating gun 28 by lengths of tubing 48, 50. Actuation of release coupling 40, for example by use of a wireline tool suspended from the surface 14, causes tubing length 50 and perforating gun 28 to detach from coupling 40 and drop into the well.

Valve 30, series connected in tubing string 20, is provided for opening and closing the flow bore of tubing string 20 to the flow of fluids. Valve 30 may, for example, be a ball valve which is opened by a 180° rotation of the upper tubing portion 42 above valve 30. It is essential that the opened flow passage of valve 30 be of sufficient diameter to permit the introduction therethrough of tools into the medial and lower portions of tubing string 20 below valve 30. Valve 30 is preferably positioned within approximately 100 feet of packer 22, but may vary somewhat depending on the apparatus included in that portion of tubing string 20 therebelow.

Referring still to FIG. 1, an on/off sub 34 is serially positioned in tubing string 20 between packer 22 and valve 30 in the length of medial tubing portion 44 between valve 30 and on/off sub 34. On/off sub 34 permits the entire length of tubing string 20 above sub 34, namely upper and medial tubing portions 42, 44 (sometimes hereafter referred to as the tool string) to be removed and replaced, for example, with a string of tubing more suitable for producing hydrocarbon fluids due to the absence of certain test apparatus, such as valve 30, found in the tool string.

Blanking plug sub 36 is serially positioned in tubing string 20 below on/off sub 34 and supports about its exterior packer apparatus 22. The upper end of blanking plug sub 36 is connected through a tubing string section 46 to on/off sub 34. The lower end of blanking plug sub 36 supports vent assembly 38. Blanking plug sub 36 includes an interior profile (not shown) arranged to receive therein a blanking plug which can seal off the flow bore of tubing string 20.

It should be noted for the purpose of understanding the operation of the present invention that the length (denoted by $l_2$) of tubing string 20 below valve 30, namely medial and lower tubing portions 44, 46, is negligible (approximately within 110 feet) in comparison with the length (denoted $l_1$) of upper tubing portion 42, which may be, for example, between 2,000 and 20,000 feet.

In accordance with the principles of the present invention, tubing string 20 includes an improved apparatus for providing a report of the shut-in pressure of a well which has been perforated by means of a perforating gun or a tubing string. The apparatus may also provide a readout of well temperature and pressure over an extended period of time.

The present invention provides method and apparatus for measuring the temperature and pressure, particularly the shut-in pressure, of a well which has been perforated by means of a perforating gun suspended on a tubing string, as for example described in U.S. Pat. No. 3,706,344, without having to unseat the packer and pull the entire tubing string from the borehole, such as would be required if prior art drill stem test procedures were used to evaluate the well.

Referring now to FIGS. 1-4 showing the preferred embodiments of the present invention, the pressure sensing means, indicated at 32 and 74, is mounted on the exterior of medial tubing portion 44 and projecting into upper annulus 24. Although it is not essential that the pressure sensing means be located on the exterior of tubing string 20, such a question is preferred because locating pressure sensing means in the flow bore of tubing string 20 may cause interference with through-tubing operations, such as the passage therethrough of tools. The pressure sensing means may include recording means at the surface as illustrated with respect to means 32 or may include recording means downhole as illustrated with respect to means 74. It is of course possible to use pressure sensing means 32 and 74 in combination.

Referring now to FIG. 1, pressure sensing means 32 includes an outwardly protruding housing 35 connected through a small diameter tubing 88 to a pressure monitor device at the surface 14. The small diameter tubing 88 is attached to the exterior of tubing string 20 and encircles the exterior of the valve 30 at 86, so as to permit rotation of the upper tubing string 42 without damaging tubing 88. The small diameter tubing 88 may comprise, for example, stainless steel tubing having an inner diameter of from 0.05 inch up to approximately 0.75 inch.

The pressure monitor device includes a fluid source, S, providing a flow of a pressurized fluid according to the controlling effect of a pressure regulator 66. The fluid source S and the pressure regulator 66 may also be replaced by a suitable pump (not shown) characterized by a constant discharge pressure. The fluid may be a compressible or noncompressible fluid. An inert gas, such as nitrogen or helium, would work well as the fluid of the present invention.

Pressurized fluid flows by way of a fluid line 64 through a pressure sensor 62 and from there through a flowmeter 60 by way of an adjoining fluid line. The flowmeter 60 measures the flow rate of the pressurized fluid and communicates this flow data through an output signal line 70 to a suitable recording apparatus 68, such as a chart recorder, a digital record or a graphic plotter. The pressure sensor 62 provides pressure data to the recording apparatus 68 through signal line 72. The pressure regulator 66, the flowmeter 60, the pressure sensor 62, and the recording apparatus 68 are well known to those skilled in the art and are readily available from any of several manufacturers or easily constructed from well-known principles.

The open lower end of the small diameter tubing 88 is fixedly received within housing 35, the interior of which, as hereafter set forth, is in fluid communication with the flow bore of the medial tubing portion 44. In operation, the pressure regulator 66 is adjusted to obtain a desirable rate of fluid flow therethrough. The flow of fluid through the pressure tubing 88 is measured by the flowmeter 60 and compared by means of the recording apparatus 68 to data obtained by precise empirical calibration of the pressure measuring apparatus before its insertion into the borehole. The apparatus may be calibrated, for example, to relate flow through the pressure tubing 88, at a fixed source pressure, to a particular pressure at the downhole end of the tubing 88. In this arrangement, the fluid source S is a constant pressure source providing a flow of fluid at a rate which varies in response to changing downhole pressure. The apparatus is calibrated to correlate flow rate to downhole pressure. The recording apparatus 68 may, for example, include a microprocessor which relates the measured flow to the downhole pressure and plots that pressure as a function of time on a chart.

Pressure sensing means 32 alternatively may include the Pressure Transmission System (PTS) of NL Sperry Sun, a Division of NL Industries, Inc., as the pressure monitor device. The PTS device includes a downhole chamber, positioned within housing 35, connected by the small diameter pressure tubing 88 to a surface readout unit 68. The chamber and tubing 88 are charged with a single-phase gas, such as nitrogen or helium, from the surface. A diaphragm on the chamber compresses the enclosed gas in response to changes in the ambient borehole pressure. A pressure gauge 60 at the surface end of tubing 88 is calibrated to provide a readout of the downhole pressure. The PTS device is described generally in the 1982-1983 Catalog of NL Sperry Sun, reprinted in IV Composite Catalogs of Oil-field Equipment and Services 6425-26 (1982-83).

Figure 4:
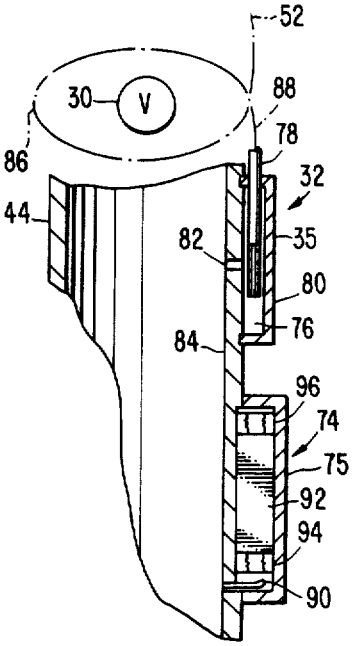
FIG. 4 shows an enlarged, cross-sectional view taken along line 4—4 of FIG. 1.

Referring now to FIG. 4, housing 35 defines an interior chamber 76 which is connected in fluid communication with the interior of the medial tubing string 42 through a port 82. The lower end 80 of small diameter tubing 88 is open to permit the efflux of fluids into the chamber 76. As may be noted from the above description, the open-ended embodiment of tubing 88 shown in FIG. 4 corresponds to the first-described embodiment of pressure monitor device. The second-described embodiment of pressure monitor device (PTS device) includes on the end 80 of tubing 88 an enclosed chamber (not shown) which includes a diaphragm. The enclosed chamber of the PTS device is affixed within the housing 35 on medial tubing portion 44, so as to communicate changes in downhole pressure to the surface.

Referring now to FIG. 1 and another embodiment of the pressure sensing means, pressure sensing means 74 includes a housing 75 protruding outwardly from the medial tubing portion 44 for supporting therein a self-contained temperature or pressure recording apparatus, such as an Amerada bomb, manufactured by Geophysical Research Corp. of Tulsa, Okla. The Amerada bomb is a gauge for measuring temperature or pressure, including a clock, a sensing element, such as a helically wound bourdon tube, and a recording element.

Referring now to FIG. 4, housing 75 supports the self-contained apparatus 92 between a pair of shock mounts 94, 96. A small pipe or port 90 connects the interior of housing 75 in fluid communication with the interior of the medial tubing portion 44 and thereby subjects the apparatus 92 to well temperature and pressure. Means (not shown) is provided on the exterior of housing 75 for removing therefrom and replacing the apparatus 92.

Operation of the Preferred Embodiment

In operation, tubing string 20 of FIG. 1 is lowered into the cased borehole 10 substantially dry. Packer 22 is actuated to effect a seal between upper annulus 24 and lower annulus 26 and vent assembly 38 is actuated to open the ports therein, so as to equalize the pressure of lower annulus 26 with that of the interior of tubing string 20.

When the apparatus is ready, perforating gun 28 is fired, creating a plurality of perforations and channels through casing 16 and into the surrounding formation 18. The pressure differential between the formation pressure and tubing pressure induces an immediate backsurge of well fluids into lower annulus 26, into the interior of tubing string 20 and up to the surface. The backsurge cleans the perforations and channels of debris, mud filtrate, and other contaminants and thereby reduces permanent damage to the formation. The well is permitted to produce until thoroughly clean and then is shut-in by closing valve 30, such as by rotating upper tubing portion 42 180°.

Figure 5:
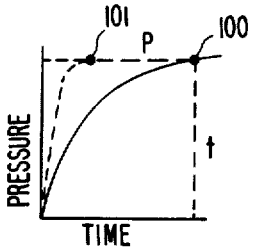
FIG. 5 shows a graph which illustrates two downhole variables of the borehole of FIG. 1.

The relatively negligible length $l_2$ of medial tubing portion 44 as compared to the length $l_1$ of upper portion 42 significantly reduces the period of time required to build up to the shut-in pressure as FIG. 5 graphically illustrates. If the well is shut-in by means of a valve 55 at the surface 14, the length of time required to reach the ultimate shut-in pressure might correspond roughly to point 100 on the solid curve. When the volume of tubing string 20, which must be filled, is substantially reduced by shutting in the well at valve 30, the length of time required to attain the shut-in pressure is reduced to point 101 on the dashed curve. Hence, use of valve 130 rather than valve 55 to shut-in the well substantially reduces the period of time required to measure the shut-in pressure.

The actual pressure measurements are obtained using one or both of the aforedescribed pressure sensing means 32, 74. Sensing means 32, for which two possible embodiments were described, includes means at surface 14 for providing an indication of the downhole pressure. The surface indication of pressure may include a plot of pressure as a function of time, in addition to an indication of absolute pressure at any point in time.

Pressure sensing means 74, which includes the self-contained apparatus 92, (FIG. 4) records pressure (or temperature if such is more desirable) as a function of time over an extended period of time. The record generated by apparatus 92, however, is available for examination only after the tool string (which includes the upper tubing portion 42 and the medial tubing portion 44) is pulled from the well, as hereafter described.

Figure 2:
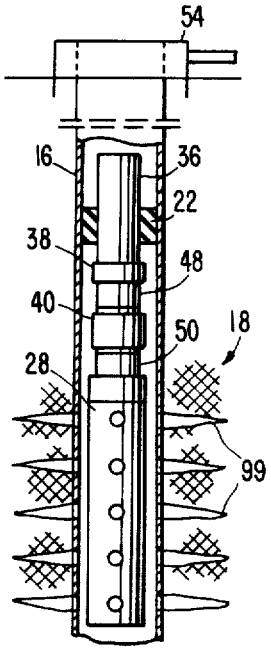
FIG. 2 shows a portion of the borehole of FIG. 1 in a later stage of operation.

Referring now to FIG. 2, casing 16 has been perforated to form perforations and channels 99 within the surrounding formation 18, the well has been shut-in, and all initial testing and measuring has been completed. If necessary or desirable, the tool string may now be removed. Such may be required where, as mentioned above, it is is necessary to access self-contained apparatus 92 (FIG. 4) or where test apparatus in the tool string makes it cumbersome to produce through the string or where it is desired to complete upper formations before producing the formation just completed. It should be noted, however, that production may proceed immediately without removing or replacing the tool string.

Before removing the tool string, a blanking plug (not shown) is positioned within the corresponding profile of blanking plug sub 36 so as to seal off the flow of well fluids through lower tubing portion 46. The tool string (upper and medial tubing portions 42,44) may then be disengaged by use of an on/off tool (not shown) at on/off sub 34 from lower tubing portion 46.

Figure 3:
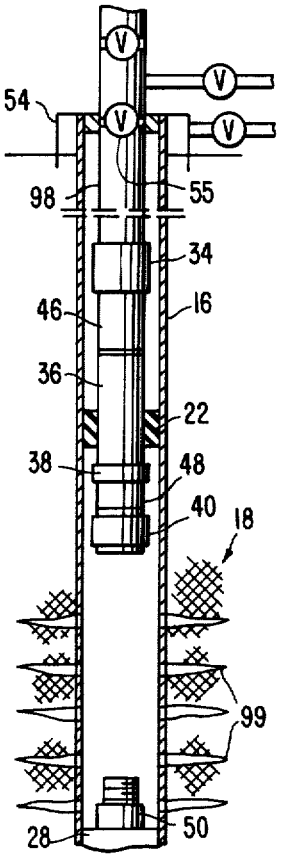
FIG. 3 shows the borehole of FIG. 1 at a point in time later than that of FIG. 2.

Referring now to FIG. 3, formation 18 subsequently may be produced by stabbing a string of production tubing 98 onto blanking plug sub 36, removing the blanking plug, and opening valve 55 to permit the flow of well fluids therethrough. Where desirable, the perforating gun 28 may be disengaged at releasable coupling 40 to drop gun 28 down into the well.

DESCRIPTION OF AN ALTERNATIVE EMBODIMENT

Figure 6:
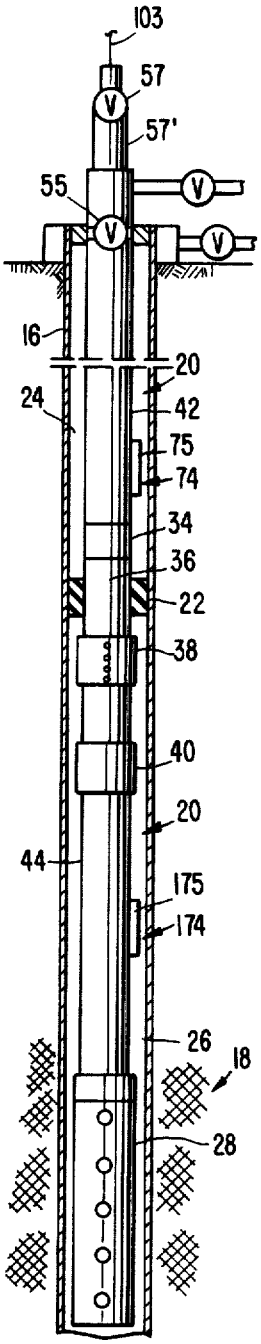
FIG. 6 shows the borehole of FIG. 1 including an alternative embodiment of the present invention.
Figure 7:
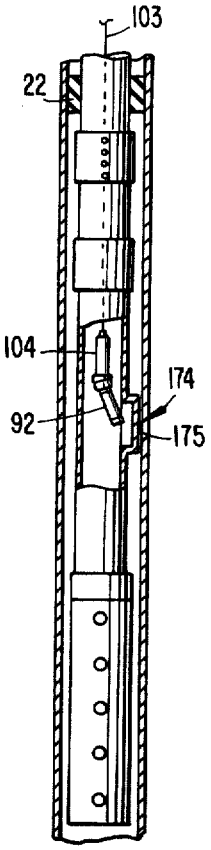
FIG. 7 shows a broken view of a part of the tubing string depicted in FIG. 6.
Figure 8:
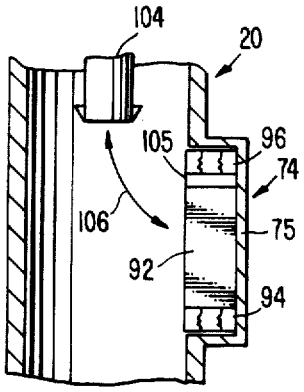
FIG. 8 shows an enlarged, cross-sectional view of a part of FIG. 6.

Referring generally to FIGS. 6–8, there is shown an embodiment of the invention wherein another type of pressure sensing means 74, 174 includes a pair of outwardly protruding housings 75, 175 which open to the interior of tubing string 20, so as to facilitate removal and replacement of apparatus 92 without pulling tubing string 20 from the well.

Referring particularly to FIG. 6, a string of tubing 20 is concentrically disposed within a cased borehole in a manner substantially the same as in FIG. 1, described above. Tubing string 20 of FIG. 6, however, does not include a housing 35, but includes an additional lower housing 175. Housing 175 is identical in structure to housing 75, but is positioned on tubing string 20 between releasable coupling 40 and perforating gun 28.

Referring now to FIGS. 7 and 8, housing 175 (which is identical to housing 75) is open to the interior of tubing string 20. A slickline or wireline 103, having a fishing tool 104 affixed to the lower end thereof, is used to remove self-contained pressure measuring apparatus 92 from, and replace the same within, housing 175 in a manner similar to that used to remove and replace a gas lift valve. As shown in FIG. 8, apparatus 92 includes a fishing neck 105 whereby fishing tool 104 can engage the apparatus 92, in a manner well known to those skilled in the art.

In summary, the present invention provides a method and apparatus for measuring the pressure and temperature of a well perforated by means of a perforating gun suspended on a tubing string. Prior to the development of the present invention, detailed well evaluation was a cumbersome or impossible task for a well completed by use of such method.

While a preferred embodiment of the invention has been shown and described, modifications thereof can be made by one skilled in the art without departing from the spirit of the invention.

What is claimed is:

1. A method for completing and/or testing a hydrocarbon formation of a well having a cased borehole, comprising the steps of:

running a string of production tubing into the borehole, said tubing string including a perforating gun on the lower end thereof, a valve above, but relatively near, the perforating gun, a packer apparatus below the valve, and a vent assembly below the packer apparatus;

setting the packer apparatus;

opening the vent assembly;

firing the perforating gun;

shutting-in the well at the valve; and measuring the shut-in pressure within said tubing string below the valve.

2. A method according to claim 1 further comprising the step of placing a pressure measuring sensor means in communication with said tubing string below the valve prior to said firing.

3. A method according to claim 2 further comprising the steps of:

removing a tool string from the borehole; and stabbing a production string in place of the tool string.

4. Apparatus for completing and/or testing a well having a cased borehole, comprising:

a string of production tubing disposed within the cased borehole;

a perforating gun attached to the downhole end of said tubing string; the perforating gun having an impact responsive firing head;

a weighted object adapted to pass through the tubing to impact and actuate the firing head;

means on said tubing string near said perforating gun for closing the interior of said tubing string to the flow of fluids in a first state of operation and in a second state of operation providing an opening therethrough of sufficient size to permit the weighted object to pass therethrough; and means on said tubing string downhole of said closing means for measuring pressure within said tubing string.

5. Apparatus according to claim 4 wherein said closing means comprises a valve which can be actuated by turning the upper end of said tubing string.

6. Apparatus according to claim 4 wherein said measuring means comprises:

a pressure measuring apparatus;

a housing affixed to said tubing string for supporting at least a portion of said measuring apparatus; and means for communicating fluid pressure within said tubing string to said housing.

7. Apparatus according to claim 6 wherein said measuring apparatus comprises a sensor means disposed within said housing and an indicating means disposed at the surface of the borehole.

8. Apparatus according to claim 6 wherein said measuring apparatus comprises a sensor means and an indicating means both disposed within said housing.

9. Apparatus according to claim 8 further comprising:

a packer apparatus disposed between the borehole casing and said tubing string;

means for removing an upper portion of said tubing string including said measuring means, leaving a lower portion of said tubing string supported by said packer;

means for connecting a second string of production tubing to the lower portion of said tubing string; and means for releasing said perforating gun from the downhole end of said tubing string.

10. Apparatus according to claim 8 further comprising means for retrieving and replacing said measuring apparatus while said tubing string remains disposed within the borehole.

11. Apparatus according to claim 10, wherein said retrieving and replacing means comprises:

means for accessing said housing from the interior of said tubing string;

a wireline; and means on said wireline for gripping said measuring apparatus.

12. Apparatus for completing and/or testing a well having a cased borehole, comprising:

a string of production tubing disposed within the cased borehole;

a perforating gun having an impact responsive firing head affixed to the lower end of said tubing string;

a weighted object adapted to pass through the tubing to impact and actuate the firing head;

a housing protruding from the exterior of said tubing string, said housing being in fluid communication with the interior of said tubing string;

a valve within said tubing string *near said perforating gun and* above said housing for closing said tubing string in a first state of operation and, in a second state of operation, providing an opening therethrough of sufficient size to permit the weighted object to pass therethrough; and means for measuring pressure within said tubing string, at least a portion of said measuring means being disposed within said housing.

13. Apparatus according to claim 12 wherein said measuring means comprises a sensor means disposed within said housing and an indicating means disposed at the surface of the borehole.

14. Apparatus according to claim 13 wherein said measuring means comprises:

a source of fluid, said source providing a generally positive flow of fluid at a substantially constant pressure;

means for transporting a continuous flow of fluid from said source into a borehole;

means for measuring the flow rate of fluid through said transporting means and providing an output indicative thereof;

means for measuring pressure in said transporting means near said source and providing an output indicative thereof; and means connected to said pressure measuring means for determining pressure in the borehole.

15. Apparatus according to claim 12 wherein said measuring means comprises a sensor means and an indicating means both disposed within said housing.

16. Apparatus according to claim 15 further comprising means for replacing and retrieving said measuring means from the interior of said tubing string without pulling said tubing string.

*17. Apparatus for perforating and testing a hydrocarbon formation in a well having a cased borehole comprising:*

*a string of tubing disposed within the borehole:*

*perforating means attached to the downhole end of said tubing string for creating one or more perforations through the sides of the borehole and into the formation;*

*valve means located relatively near said perforating means for closing the interior of said tubing string to the flow of fluids when it is in a first state of operation and for opening the interior of said tubing string to the flow of fluids when it is in a second state of operation:*

*packer means located proximate said perforating means and said valve means for selectively effecting a seal between the exterior of said tubing string and the interior of the borehole;*

*means for selectively opening and closing said valve means to open or shut-in the well;*

*means located below said packer means for providing a fluid communication between the interior of said tubing string and the annulus between said tubing string and the borehole;*

*pressure sensing means associated with said tubing string and proximate to said valve means for sensing the pressure within said tubing string below said valve means; and*

*surface indication means at the surface of the well and in communication with said pressure sensing means for providing a surface readout of the sensed pressure while said packer means is sealed and said tubing string and said associated sensing means remains disposed in the borehole.*

*18. Apparatus for perforating and testing a hydrocarbon formation in a well having a cased borehole comprising:*

*a string of tubing disposed within the borehole;*

*perforating means attached to the downhole end of said tubing string for creating one or more perforations through the sides of the borehole and into the formation;*

*valve means located relatively near said perforating means for closing the interior of said tubing string to the flow of fluids when it is in a first state of operation and for opening the interior of said tubing string to the flow of fluids when it is in a second state of operation:*

*packer means located proximate said perforating means and said valve means for selectively effecting a seal between the exterior of said tubing string and the interior of the borehole;*

*means for selectively opening and closing said valve means to open or shut-in the well;*

*means located below said packer means for providing a fluid communication between the interior of the tub-*

*ing string and the annulus between said tubing string and the borehole;*

*a housing incorporated in said tubing string, said housing being located proximate said valve means and above said fluid communication means and being radially displaced from but in fluid communication with the interior bore of said tubing string; and*

*pressure measuring means disposed at least in part within said housing for measuring the pressure within said tubing string below said valve means while said packer means is sealed and said tubing string remains disposed in the borehole.*

*19. The apparatus according to claim 17 or 18 wherein said perforating means includes a perforating gun and a means for selectively firing said perforating gun.*

*20. The apparatus according to claim 19 wherein said firing means includes an impact responsive firing head on said perforating gun and a weighted object adapted to pass through the tubing string to impact and actuate said firing head.*

*21. The apparatus according to claim 20 wherein said valve means when open provides an opening of sufficient size in said tubing string to permit said weighted object to pass therethrough.*

*22. The apparatus according to claim 17 or 18 wherein said valve means when open provides an opening of sufficient size in said tubing string to permit the introduction of tools therethrough.*

*23. The apparatus according to claim 22 wherein said valve means is a ball valve which is opened by the rotation of the tubing string above said valve.*

*24. The apparatus according to claim 17 or 18 wherein said perforating means is within 110 feet of said valve means.*

*25. The apparatus according to claim 17 or 18 wherein the volume of said tubing string below said valve means is negligible in comparison to the volume of said tubing string above said valve means.*

*26. The apparatus according to claim 17 or 18 wherein said means for selectively opening and closing said valve means is operated by manipulation of the upper end of said tubing string at the surface of the well.*

*27. The apparatus according to claim 17 or 18 wherein said means for providing a fluid communication includes a vent assembly having ports which can be selectively opened and closed.*

*28. The apparatus according to claim 17 further comprising a housing incorporated in said tubing string at a location below said valve, said housing being radially displaced from but in fluid communication with the interior bore of said tubing string and said pressure sensing means being disposed within said housing.*

*29. The apparatus according to claim 18 wherein said pressure measuring means includes a self-contained pressure sensing and recording means which is completely disposed within said housing.*

*30. The apparatus according to claim 29 further comprising means for retrieving the self-contained pressure sensing and recording means while said tubing remains disposed within the borehole.*

*31. The apparatus according to claim 30 wherein said retrieving means comprises:*

*means for accessing said housing from the interior of said tubing;*

*a wireline; and*

*means on said wireline for gripping said self-contained pressure sensing and recording means.*

*32. The apparatus according to claim 18 wherein said pressure measuring means includes a pressure sensing means proximate said valve means and a surface indication means at the surface of the well and in communication with said pressure sensing means for providing a surface readout of the sensed pressure while said packer means is sealed and the tubing string remains disposed in the borehole.*

*33. The apparatus according to claim 17 or 32 further comprising a secondary pressure measuring means in the form of a self-contained pressure sensing and recording means associated with said tubing string, radially displaced from but in communication with the interior bore of said tubing string, and proximate to said valve means for simultaneously sensing and recording the pressure within said tubing string below said valve means.*

*34. The apparatus according to claim 17 or 18 further comprising means for releasing said perforating gun from said tubing string.*

*35. The apparatus according to claim 17 or 18 further comprising a blanking plug sub means located above said packer means for accepting a blanking plug to blank off said tubing string below said blanking plug sub means.*

*36. The apparatus according to claim 17 or 18 further comprising an on/off sub means located above said packer means for permitting the removal of the portion of said tubing above said on/off means while leaving the lower portion of said tubing string supported by said packer means.*

*37. The apparatus according to claim 18 wherein said pressure measuring means is a self-contained pressure sensing and recording means and further comprising a pressure sensing means proximate said valve means for sensing the pressure within said tubing string below said valve means and a surface indication means at the surface of said well and in communication with said pressure sensing means for providing a surface readout of the sensed pressure while said packer means is sealed and said tubing string and said associated sensing means remains disposed in the borehole.*

*38. The apparatus according to claim 18 wherein said housing protrudes from the exterior of said tubing string.*

*39. A method for perforating and testing a hydrocarbon formation in a well having a cased borehole comprising the steps of:*

*running a string of tubing into the borehole, said tubing string including a perforating gun on the lower end thereof, a shut-in valve above, but relatively near, the perforating gun, a packer apparatus proximate the perforating gun and the valve, and means for admitting well fluids into the tubing string at a location below the packer;*

*setting the packer apparatus to effect a seal between the exterior of the tubing string and the borehole;*

*firing the perforating gun to create a plurality of perforations and channels through the sides of the borehole and into the formation;*

*shutting the valve to shut-in the well while the packer is sealed and the tubing string is in place;*

*measuring the shut-in pressure within said tubing string below the valve while the packer apparatus is sealed, the shut-in valve is closed, and the tubing string remains disposed in the borehole and for at least the period of time required for the shut-in pressure to build up to the ultimate shut-in pressure; and*

*simultaneously providing a surface readout of the measured shut-in pressure.*

*40. A method for perforating and testing a hydrocarbon formation in a well having a cased borehole comprising the steps of:*

*running a string of tubing into the borehole, said tubing string including a perforating gun on the lower end thereof, a shut-in valve above, but relatively near, the perforating gun, a packer apparatus proximate the perforating gun and the valve, means for admitting well fluids into the tubing string at a location below the packer, and a pressure sensing means above the admitting means and proximate the valve;*

*setting the packer apparatus to effect a seal between the exterior of the tubing string and the borehole;*

*firing the perforating gun to create a plurality of perforations and channels through the sides of the borehole and into the formation;*

*shutting the valve to shut-in the well while the packer is sealed and the tubing string is in place;*

*measuring with the pressure sensing means the shut-in pressure within said tubing string below the valve while the packer apparatus is sealed, the shut-in valve is closed and the tubing string remains disposed in the borehole and for at least the period of time required for the shut-in pressure to build up to the ultimate shut-in pressure; and*

*simultaneously providing a surface readout of the measured shut-in pressure.*

*41. The method according to claim 39 or 40 wherein the step of simultaneously providing a surface readout includes the step of providing a surface readout of both the measured shut-in pressure as a function of time and the absolute measured shut-in pressure at any point in time.*

*42. The method according to claim 39 or 40 further comprising the step of permitting the well to produce until the perforations and channels are cleaned of debris before initiating the step of shutting the valve.*

*43. The method according to claim 39 or 40 wherein the valve is within 110 feet of the perforating gun.*

*44. The method according to claim 39 or 40 wherein the volume of the tubing string below said packer is negligible as compared to the volume of tubing string above said packer.*

*45. The method according to claim 39 or 40 wherein the step of running the string of tubing into the borehole further includes running an on/off sub and a blanking plug sub into the borehole on said string of tubing, said on/off sub being located between said valve and said packer, and said blanking plug sub being located between said on/off sub and said packer.*

*46. The method according to claim 45 further comprising the step of positioning a blanking plug within the blanking plug sub, disengaging the tool string at the on/off sub, and retrieving the tubing string above said on/off sub.*

*47. The method according to claim 39 or 40 wherein the step of firing the perforating gun includes passing a weighted object through the tubing string to impact and actuate the perforating gun.*

*48. The method according to claim 39 further comprising the step of placing a pressure sensing means in communication with said tubing string below the shut-in valve prior to the step of firing the perforating gun.*

*49. The method according to claim 39 or 40 further comprising the step of selectively opening and closing the shut-in valve to respectively flow and shut-in the well while the packer is sealed and the tubing string is in place.*

*50. The method according to claim 40 further comprising the step of retrieving the pressure sensing means while the tubing string remains in the well.*

*51. The method according to claim 39 or 40 further comprising the step of recording the measured pressure at the surface of the well as a function of time.*

*52. The method according to claim 39 or 40 further comprising the step of recording the measured pressure at both the surface of the well and downhole.*

*53. The method according to claim 39 or 40 wherein the tubing string is run into the borehole while the tubing string is substantially dry.*

*54. The method according to claim 39 or 40 wherein said means for admitting well fluids is a vent assembly and further comprising the steps of running the vent assembly into the borehole in a closed position and opening the vent assembly after setting the packer apparatus.*

* * * * *